May 15, 1962  S. A. MURDOCK ET AL  3,035,009
GRAFT COPOLYMERS OF MONOMERIC ACRYLATES AND MONOMERIC ORGANIC
SULFONIC ACID COMPOUNDS UPON POLYVINYLLACTAMS
ACRYLONITRILE POLYMER COMPOSITIONS OBTAINABLE
THEREWITH, AND METHOD OF PREPARATION
Filed Nov. 25, 1957

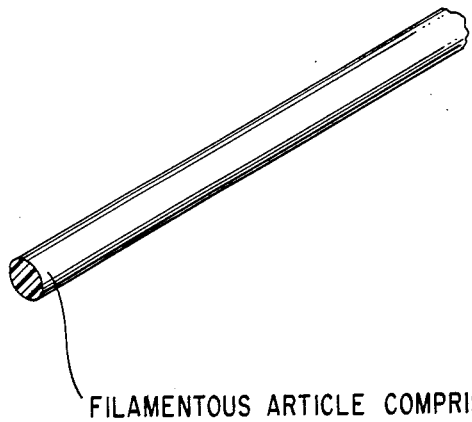

FILAMENTOUS ARTICLE COMPRISED OF AN ACRYLONITRILE POLYMER HAVING A GRAFT COPOLYMER OF A MIXTURE OF AN ACRYLATE MONOMER AND A MONOMERIC ORGANIC SULFONIC ACID COMPOUND GRAFT COPOLYMERIZED UPON A VINYL LACTAM POLYMER INCORPORATED THEREIN.

*INVENTORS.*
STANLEY A. MURDOCK
CLYDE W. DAVIS
FORREST A. EHLERS

BY *Griswold & Burdick*
ATTORNEYS

United States Patent Office 3,035,009
Patented May 15, 1962

3,035,009
GRAFT COPOLYMERS OF MONOMERIC ACRYLATES AND MONOMERIC ORGANIC SULFONIC ACID COMPOUNDS UPON POLYVINYLLACTAMS, ACRYLONITRILE POLYMER COMPOSITIONS OBTAINABLE THEREWITH, AND METHOD OF PREPARATION
Stanley A. Murdock, Concord, Calif., Clyde W. Davis, Williamsburg, Va., and Forrest A. Ehlers, Walnut Creek, Calif., assignors to The Dow Chemical Company, Midland, Mich., a corporation of Delaware
Filed Nov. 25, 1957, Ser. No. 698,738
22 Claims. (Cl. 260—45.5)

The present invention resides in the general field of organic chemistry and contributes specifically to the polymer art, especially with respect to certain graft copolymers and fiber-forming polymer blends obtainable therewith. In this way, the invention is pertinent to the man-made synthetic textile fiber industry. It is particularly concerned with the graft copolymeric products of mixtures of certain monomeric acrylates and certain monomeric organic sulfonic acid compounds that are graft copolymerized in admixture upon or with polyvinyllactams. Such graft copolymeric products have especial utility as dye-receptive, antistatic and stabilizing additaments for acrylonitrile polymer compositions which, advantageously, may be of the fiber-forming variety. The invention is also concerned with the compositions that may be obtained by blending the graft copolymers with acrylonitrile polymers, as well as with shaped articles which have been fabricated therefrom, that have significantly enhanced properties and characteristics as regards improvements in and relating to enhanced dye-receptivity, minimized inherent propensity to accumulate electrostatic charges and an augmented natural stability to various deteriorating influences, including stability against becoming deleteriously influenced and degraded upon exposure to heat at elevated temperatures and light. Within the scope and purview of the invention there is comprehended both the novel and utile graft copolymers and blended polymer compositions of the indicated varieties (as well as various shaped articles fabricated therefrom and comprised thereof) and advantageous methods for their preparation.

It is the main purpose and primary design of the present invention to provide and make available graft copolymers of certain acrylate monomers admixed with certain monomeric organic sulfonic acid compounds upon vinyl lactam polymers that are especially well suited for being incorporated in acrylonitrile polymer compositions, particularly polyacrylonitrile, to herve in the indicated treble capacity of dye-assisting adjuvants, antistatic agents and stabilizing ingredients. It is also a principal aim and concern of the invetnion to furnish acrylonitrile polymer compositions of the above-indicated and hereinafter more fully delineated type and shaped articles therefrom that have, as intrinsic and distinguishing characteristics, excellent receptivity of and acceptability for any of a wide variety of dyestuffs; permanently imbued antistatic properties that are unusually good for and not commonly encountered in polymeric materials of the synthetic, essentially hydrophobic varieties of such substances; and efficacious natural stability to heat and light as well as to certain chemical conditions such as alkaline environments.

The blended polymer compositions of the present invention which fulfill such ends and offer corollary advantages and benefits, as will hereinafter be manifest, are, in essence, comprised of an intimate and practically inseparable blend or alloy constitution of (A) an acrylonitrile polymer that contains in the polymer molecule at least about 80 percent by weight of polymerized acrylonitrile which preferably is of the fiber-forming variety and, most advantageously, is polyacrylonitrile and (B) a minor proportion of a beneficial graft copolymeric additament, also a subject of the invention, that functions and serves simultaneously in the treble capacity of a dye-assisting adjuvant, permanent antistatic agent and stabilizer and which is comprised of the graft copolymerized polymerization product of (a) a mixture of monomers consisting of (1) a monomeric 2-aminoethylacrylate or 2-aminoethylmethacrylate or their monomeric dimethyl or diethyl derivatives, as hereinafter more fully delineated, and (2) a monomeric organic sulfonic acid compound (including free acid compounds and ester or salt derivatives) that contains a substituent, reactive vinyl or other alkenyl group in its molecule; upon (b) a polymerized N-vinyl lactam, particularly poly-N-vinyl-2-pyrrolidone (PVP). The method of the invention by which such compositions may be made involves incorporating the minor proportion of the graft-copolymerized polymeric additament in and with the acrylonitrile polymer base by any of several beneficial techniques, hereinafter more thoroughly defined, adapted to suitably accomplish the desired result. The graft copolymers are themselves made by graft copolymerizing the mixture of monomers upon the polyvinyllactam substrate, as hereinafter demonstrated.

Without being limited to or by the specific embodiments and modes of operation set forth, the invention is illustrated in and by the following docent examples wherein, unless otherwise indicated, all parts and percentages are to be taken on a weight basis.

EXAMPLE A

A polymeric additament satisfactory for use in the practice of the present invention was preparing by charging into a suitable reaction vessel about 5.9 grams of ethylene sulfonic acid; about 9.0 grams of 2-aminoethylmethacrylate, hydrochloride (2–AEMA, HCl); 59.5 grams of PVP having a Fikentscher K-value of about 57; 175 grams of water and 0.2 gram of ammonium persulfate. The pH of the resulting mixture was about 1. The mixture was heated while being maintained in a nitrogen atmosphere with continued agitation for about 18 hours. The resulting graft copolymer product was soluble in the aqueous polymerization mass. Conversion of the monomers to polymers was found to be about 95 percent to provide a graft copolymer product that contained about 84 percent of the PVP constituent upon which there was graft copolymerized about 6 percent of the polymerized ethylene sulfonic acid constituent and 10 percent of the polymerized 2–AEMA, HCl constituent.

The dissolved graft copolymeric product was diluted with water to form a solution having about 2.5 percent of polymeric solids contained therein. This was used as an impregnating bath according to the procedure of the following example to obtain polyacrylonitrile fibers containing intimately incorporated therein about 3.4 percent, based on the weight of the final fiber product, of the graft copolymeric additament. The graft copolymer-containing fiber product was found to have good dye-receptivity, quite satisfactory stability to heat and light, and an unusually slight or low propensity to accumulate charges of static electricity. To determine the extent of its stability to ultraviolet light, the graft copolymer-containing fiber product was placed, under standard test conditions, in an Atlas Fadeometer. No discernible break in color was observed until after 240 hours of exposure. In comparison, an ordinary unmodified polyacrylonitrile fiber of the same type which was tested in the same way for control purposes broke in color after only about 120 hours of ultraviolet light exposure.

EXAMPLE B

The general procedure of the first example was followed to prepare two polymeric additaments with the following mixture that was duplicated to provide polymerization charges for each:

| | Parts |
|---|---|
| Sodium styrene sulfonate | 20.1 |
| 2-aminoethylmethacrylate | 18.1 |
| PVP | 156.4 |
| Water | 350 |
| pH of mixture | 6 |
| Ammonium persulfate | 0.4 |

One of the charges was heated under a nitrogen blanket at 49° C. with continued agitation for 19 hours. Conversion of the monomeric constituents from the charge to polymeric product was about 95.9 percent. The polymeric product was found to contain about 84 percent of PVP; about 8.5 percent of the polymerized sodium styrene sulfonate monomer; and about 7.5 percent of the polymerized 2-AEMA monomer. The polymer product was obtained as a stable white emulsion which consisted essentially of a graft copolymer of the sodium styrene sulfonate and the 2-AEMA on PVP.

The pH of the other charge was adjusted to about 2 with hydrochloric acid and the reaction mass was then heated at the boiling point for about 1½ hours during which time there was obtained a complete 100 percent conversion of the monomeric constituents to polymeric product. The polymeric product was obtained as a stable white emulsion in the aqueous medium and was found to consist of about 81 percent of the PVP; about 10 percent of the polymerized sodium styrene sulfonate monomer; and about 9 percent of the polymerized 2-AEMA monomer. The polymer product was likewise a graft copolymer of the sodium styrene sulfonate and 2-AEMA on PVP.

Polyacrylonitrile fibers containing about 8 percent of the first described of the above graft copolymers were prepared by impregnating, during their hot stretching, filamentary structures that were in aquagel condition after having been salt-spun. A boiling aqueous dispersion of the graft-copolymer that contained about 1½ percent graft copolymeric solids was employed as the hot-stretching and impregnating bath. The polyacrylonitrile aquagel fiber that was employed had been obtained by extruding a spinning solution of fiber-forming polyacrylonitrile comprised of about 10 parts of the polymer dissolved in 90 parts of a 60 percent aqueous solution of zinc chloride through a spinnerette having 300 individual 6 mil. diameter orifices into an aqueous coagulating bath that contained about 42 percent of dissolved zinc chloride to form a multiple filament tow. After being spun, the tow bundle of coagulated polyacrylonitrile aquagel fiber was washed substantially free from salt upon being withdrawn from the coagulating bath and then hot-stretched for orientation while being simultaneously impregnated with the graft copolymer to a total stretched length that was about thirteen times its original extruded length.

Following the hot-stretching impregnation, the aquagel fiber was irreversibly dried at 150° C. to destroy the water-hydrated structure and convert it to a finished fiber form. It was then heat set for five minutes at 150° C. The finally obtained 3 denier fiber product had a tenacity of about 3.5 grams per denier, an elongation of about 33 percent and a wet yield strength of about 0.85 gram per denier. The graft-copolymer-containing acrylonitrile polymer fiber product was found to have excellent natural stability to heat and light as well as against becoming degraded under the influence of aqueous alkaline media at pH levels as high as 10. It was found to be nearly free of propensity under normally humid conditions to accumulate charges of static electricity upon handling; being about commensurate with viscose rayon fibers in this regard. As is widely appreciated, viscose rayon yarn and fibers are not considered to be afflicted to a troublesome degree with problems due to static.

The graft-copolymer-impregnated fiber product dyed well to deep and level shades of coloration with Calcodur Pink 2BL, a direct type of dyestuff (Colour Index Direct Red 75, formerly Colour Index 353) and Sevron Brilliant Red 4G, a basic dye formerly known as Basic Red 4G (Colour Index Basic Red 14).

The dyeing with Calcodur Pink 2BL was performed at the 4 percent level according to conventional procedure in which the fiber sample was maintained for about one hour at the boil in the dyebath which contained the dyestuff in an amount equal to about 4 percent of the weight of the fiber. The dyebath also contained sodium sulfate in an amount equal to about 15 percent of the weight of the fiber and had a bath-to-fiber weight ratio of about 30:1. After being dyed, the fiber was rinsed in water and dried for about 20 minutes at 80° C. The dye-receptivity of the Calcodur Pink 2BL-dyed fiber was then evaluated spectrophotometrically by measuring the amount of monochromatic light having a wave length of about 520 millimicrons from a standard source that was reflected from the dyed sample. A numerical value on an arbitrarily designated scale from zero to one hundred was thereby obtained. This value represented the relative comparison of the amount of light that was reflected from a standard white tile reflector that had a reflectance value of 316 by extrapolation from the 0–100 scale. Lower reflectance values are an indication of better dye-receptivity in the fiber. For example, a reflectance value of about 20 or 25 to 50 or so for acrylonitrile polymer fibers dyed with 4 percent Calcodur Pink 2BL is generally considered by those skilled in the art to be representative of a degree of dye-receptivity that readily meets or exceeds the most rigorous practical requirements and is ordinarily assured of receiving general commercial acceptance and approval. The Calcodur Pink 2BL-dyed polyacrylonitrile fibers containing the above-described polymeric additament in accordance with the invention had a reflectance value of about 20. In contrast, ordinary unmodified polyacrylonitrile fibers of the same type generally have a reflectance value of about 130 on the same numerical scale.

The antistatic properties of the graft-copolymer-containing fiber were then determined by measuring the electrical conductance of the fiber product at various humidities. As will be appreciated by those who are skilled in the art, the basis for such a test is that all fibers have a tendency to generate static electricity upon being handled. Only those that are possessed of sufficient electrical conductance to dissipate the charge as quickly as it forms are not hampered by the bothersome effects of static electricity. Thus, a measure of the electrical conductance of a fiber is a good indication of its ability to dissipate static electricity. The conductivities of the various fiber samples tested were found by determining their electrical resistances. Resistance, of course, is the reciprocal quantity of conductivity. In order to permit various fiber samples to be compared on the common basis, the conductivities of the samples tested were actually measured as volume resistivities according to the following formula:

$$\text{Volume resistivity} = \frac{(\text{resistance})(\text{cross-sectional area})}{\text{path length between electrodes to which sample being tested is attached}}$$

The units of volume resistivity are ohm-cm.$^2$/cm.

Prior to being tested, the graft copolymer-containing polyacrylonitrile fiber prepared in the indicated manner was scoured for ½ hour at the boil using about 1.0 percent on the weight of the fiber of "Igepal CA-630" (an alkylphenoxypolyoxyethylene ethanol type of non-ionic detergent and a 30:1 volume: fiber ratio of water. After being scoured, the first sample was washed thoroughly with water and dried. The actual resistivity of each sample was determined after the sample being tested was conditioned for seventy-two hours at the particular temperature and relative humidity conditions involved by tautly connecting a web-like sample of the yarn between two electrodes, each of which were 9 centimeters long spaced parallel 13 centimeters apart, and across which there was applied a 900 volt direct current potential. For purposes of comparison, the volume resistivity of cotton, wool and an unmodified polyacrylonitrile fiber (obtained in the same way as the graft-copolymer-containing fiber but without having the polymeric additament incorporated therein) were also tested in the indicated manner along with the graft-copolymer-containing fiber in accordance with the present invention.

The results are set forth in the following tabulation which indicates the volume resistivities obtained at various relative humidities (RH) at 23° C. of each of the samples tested.

*Table 1.—Volume Resistivities of Various Fiber Samples Compared to Polyacrylonitrile Fibers Impregnated With Graft Copolymers of Sodium Styrene Sulfonate and 2-AEMA, HCl on PVP*

| Sample | Volume Resistivity, Ohm-cm.$^2$/cm. | | | |
|---|---|---|---|---|
| | 32 percent RH | 47 percent RH | 58 percent RH | 66 percent RH |
| Graft-copolymer-impregnated polyacrylonitrile fiber | 6.7×10$^{11}$ | 1.6×10$^{10}$ | 2.1×10$^9$ | 8.4×10$^7$ |
| Cotton | 6.4×10$^9$ | 2.7×10$^8$ | 3.0×10$^7$ | 5.4×10$^6$ |
| Wool | 5×10$^{12}$ | 2×10$^{11}$ | 1.9×10$^{10}$ | 3.3×10$^9$ |
| Unmodified polyacrylonitrile fiber | 3×10$^{14}$ | 2.7×10$^{13}$ | 5×10$^{12}$ | 1.2×10$^{12}$ |

As is apparent from the foregoing, the graft copolymer-containing fiber sample, even after being severely scoured, had electrical conductance properties much superior to ordinary polyacrylonitrile fibers and only slightly poorer than cotton. At the same time, the physical properties of the graft copolymer-containing fiber were excellent, being about equal to those of the unmodified polyacrylonitrile fibers.

Equivalent results are obtained when the foregoing procedure is repeated excepting to impregnate the aquagel fiber with the copolymer additive prior to the stretch-drawing operation on the fiber.

EXAMPLE C

Following the procedure of the preceding examples, a polymeric additament suitable for use in the practice of the present invention was made from the following charge:

2-sulfoethylacrylate, sodium salt (SEA, Na) _grams_ 10
2-aminoethylacrylate, hydrochloride
(2-AEA, HCl) _____do____ 8.2
PVP (Fikentscher K-value 57) _____do____ 72.8
Water _____ml__ 175
Ammonium persulfate _____gram__ 0.2

Prior to polymerization, the pH of the mixture was adjusted to about 3.0 with HCl. The mixture was then polymerized under nitrogen for about 18 hours at 50° C. with continued agitation to make a clear, colorless solution. The copolymer product was found to contain about 10 percent of polymerized SEA, Na; 9 percent of 2-AEA, HCl; and 81 percent of PVP. Polyacrylonitrile fibers were then impregnated with the graft copolymerized polymeric additament using about a 2 percent aqueous solution of the graft copolymer as an impregnating bath. A product containing about 5.05 percent of the graft copolymer additament therein, based on the weight of the fiber, was obtained. The modified fiber product dyed well, had low static characteristics and was exceptionally light stable. It withstood more than 240 hours of ultraviolet light exposure in at Atlas Fadeometer before any break in color was discerned.

EXAMPLE D

The procedure of Example C was repeated with the following charge:

Grams
Sodium styrene sulfonate _____ 10.05
2-AEMA, HCl _____ 9.05
PVP (Fikentscher K-value 45) _____ 78.2
Ammonium persulfate _____ 0.2

A white stable emulsion of the water-insoluble graft copolymer product was obtained with high conversion of the monomeric ingredients to polymer product. The polymeric additament was found to contain about 10 percent of polymerized styrene sulfonic acid; about 9 percent of polymerized 2-AEMA, HCl; and about 81 percent of the PVP. Polyacrylonitrile fibers were impregnated while in the aquagel condition with a 2.5 percent aqueous dispersion of the graft-copolymer product (pursuant to the general procedure set forth in Example B) to provide a graft-copolymer-containing fiber having about 0.4 percent of the sodium styrene sulfonate constituent in the graft-copolymer present therein. The resulting graft-copolymer-containing fiber product had good physical properties, excellent heat, light and alkaline stability and dyed well to deep and level shades with Calcodur Pink 2BL, Calcocid Alizarine Violet, Amacel Scarlet BS and Sevron Brilliant Red 4G. The graft copolymer-containing fiber withstood 240 hours of ultraviolet light exposure in the Atlas Fadeometer before any sign of color break was noted.

EXAMPLE E

The general procedure of Example D was repeated with a graft-copolymeric polymer additament prepared from the following charge:

Sodium styrene sulfonate _____grams__ 10.05
Dimethylaminoethylacrylate (DMAEA) __do____ 7.0
PVP (Fikentscher K-value 45) _____do____ 68.2
Water _____ml__ 175
Ammonium persulfate _____gram__ 0.2

Conversion of the monomer to polymer product was high as a result of the polymerization which was conducted in the manner set forth in the foregoing example. The polymeric product contained about 11 percent of polymerized sodium styrene sulfonate; about 8 percent of the polymerized DMAEA; and about 81 percent of PVP. Polyacrylonitrile aquagel fibers were impregnated with a 2.5 percent aqueous solution of the water-soluble graft copolymer product according to the above-indicated procedure so that the graft-copolymer-containing fibers had a sufficient quantity of the polymeric additament incorporated therein to have about a 0.5 percent content of the polymerized sodium styrene sulfonate constituent of the graft copolymer. The resulting modified fiber product had excellent physical properties, good dyeability and satisfactory stability and had static characteristics about commensurate with those of cotton.

EXAMPLE F

About 21 grams of sodium styrene sulfonate, 16 grams of diethylaminoethylmethacrylate (DEAEMA), 99 grams of PVP having a Fikentscher K-value of about 57, 600 ml. of water and 0.8 gram of ammonium persulfate were charged into a reaction vessel and polymerized for 16 hours at 50° C. under a nitrogen atmosphere with continued agitation after the pH of the reaction mass was initially adjusted to about 3 with hydrochloric acid. Conversion to a clear, colorless, water-soluble graft copolymer product was nearly complete. Excellent results were achieved when the polymer product was incorporated in acrylonitrile polymer fibers as a dye-receptive, antistatic, stabilizing adjuvant.

EXAMPLE G

A graft copolymerized, dye-receptive, antistatic, stabilizing adjuvant was manufactured by graft-copolymerization of the following charge under a nitrogen atmosphere with continued agitation for 18 hours at 50° C. after initial adjusting of the pH of the charge to about 3 with hydrochloric acid:

| | Grams |
|---|---|
| SEA, Na | 10.0 |
| Dimethylaminoethylacrylate (DMAEA) | 6.4 |
| PVP (Fikentscher K-value 45) | 65.5 |
| Water | 175 |
| Ammonium persulfate | 0.2 |

The resulting graft-copolymer was found to contain about 12 percent of the polymerized SEA, Na; about 8 percent of the polymerized DMAEA; and about 80 percent of the PVP. Polyacrylonitrile fibers in aquagel form were impregnated in the above-described manner with a 2.5 percent aqueous solution of the indicated copolymer product so that the finally obtained, dried, modified acrylonitrile polymer fibers contained about 0.3 percent of the polymerized SEA, Na constituent of the polymeric additament. The resulting fiber product dyed well, had very low static characteristics, and was exceptionally stable to light, heat and alkalinity. It withstood 240 hours of continuous ultraviolet light exposure in an Atlas Fadeometer before any color break could be denoted.

EXAMPLE H

About 1.66 grams of 2-AEMA, HCl; 2.01 grams of N-acryloyl taurine, sodium salt, 8.55 grams of PVP having a Fikentscher K-value of about 57; 48.45 grams of water and 0.04 gram of potassium sulfate were mixed together and the pH adjusted to about 3 with HCl to provide a polymerization mixture. The nomenclature "taurine" is commonly employed for the designation of 2-aminoethanesulfonic acid. The mixture was heated for 16 hours with continued agitation under a nitrogen atmosphere at about 50° C. during which time conversion of the monomers to a water-insoluble graft copolymer product was substantially complete (93.9 percent). The product was obtained in an aqueous emulsion. When it was impregnated in polyacrylonitrile aquagel fibers according to the foregoing procedures so as to obtain a modified polyacrylonitrile fiber product, the resulting fiber product was found to have excellent dye-receptivity, low static characteristics and good stability to light, heat and alkaline conditions.

EXAMPLE I

Excellent results were obtained with a polymeric dye-receptive, antistatic, stabilizing additament for acrylonitrile polymer fibers with a graft-copolymer prepared in essential accordance with the method set forth in Example H using the following charge:

| | Grams |
|---|---|
| Acryloyl taurine, sodium salt | 2.01 |
| DMAEA | 1.71 |
| PVP (Fikentscher K-value 45) | 8.69 |
| Water | 49.60 |
| Potassium persulfate | 0.04 |

Results similar to those set forth in the foregoing can also be obtained when the composition of the polymeric additaments is varied using other ingredients indicated to be within the scope of the invention and when the graft-copolymeric products are incorporated in polyacrylonitrile and other of the well known acrylonitrile polymer fibers to provide articles in accordance with the present invention by blending the graft copolymer product and fiber-forming acrylonitrile polymer in a spinning composition or dope prior to its extrusion into filamentary products by either wet-spinning or dry-spinning techniques. In such instances, incidentally, it may be desirable (in order to secure optimum benefit in the practice of the invention) to employ relatively larger quantities of the graft copolymeric additament than when surface impregnation is performed so that the presence of effective quantities of the additament at or near the surface of the article is assured. Excellent results may also be obtained when other polyvinyllactams are employed for the graft copolymer additaments, including poly-N-vinylcaprolactam, and when other acrylonitrile polymer bases other than polyacrylonitrile are modified with the additaments.

The graft copolymeric additaments that are employed in the practice of the invention, as is indicated in the foregoing, are graft copolymerized products of (a) mixtures of monomers consisting of (1) 2-aminoethylacrylates and/or 2-aminoethylmethacrylates having the formula

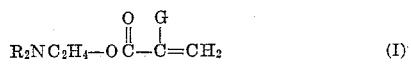

wherein each R is independently selected from the group consisting of hydrogen, methyl and ethyl and G is selected from the group consisting of hydrogen and methyl; (typical examples of which are 2-aminoethylacrylate; 2-aminoethylmethacrylate; 2 - methylaminoethylmethacrylate; 2-dimethylaminoethylacrylate; 2-dimethylaminoethylmethacrylate; 2-ethylaminoethylacrylate; 2-ethylaminoethylmethacrylate; 2-diethylaminoethylacrylate; 2-diethylaminoethylmethacrylate; 2 - methylethylaminoethylacrylate; and 2-methylethylaminoethylmethacrylate) and (2) vinyl or other alkenyl group-containing organic sulfonic acids and derivatives thereof that are selected from the group of such compounds consisting of those represented by the formulae (including mixtures thereof):

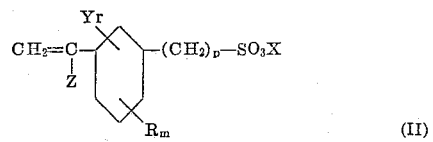

(aromatic organic sulfonic acid compounds)

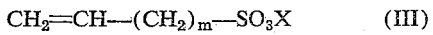

(alkenyl organic sulfonic acid compounds)

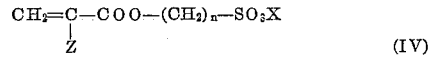

(sulfoalkylacrylate compounds)

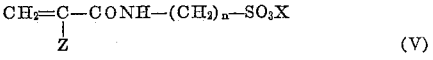

(acryloyl taurine homolog compounds)

and

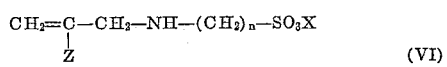

(allyl taurine homolog compounds)

all wherein X is hydrogen, an aliphatic hydrocarbon radical containing from 1 to 4 carbon atoms or an alkali metal ion; Y is hydrogen, chlorine or bromine; R is methyl or ethyl; Z is hydrogen or methyl; $m$ has a numerical value in whole number increments from 0 to 2; $n$ has a numerical value of 1 or 2; $p$ is 0 or 1; and $r$ is an integer from 1 to 4; upon (b) poly-N-vinyl lactam polymers, particularly poly-N-vinyl pyrrolidone, but including other of the poly-N-vinyllactam polymers that are known to the art, such as poly-N-vinyl-5-methyl-2-pyrrolidone, poly-N-vinylcaprolactam, poly-N-vinylpiperidone and other of those which have been described and are involved in U.S. Patent No. 2,265,450. While it may be beneficial for the vinyl lactam polymers employed for the preparation of the graft copolymeric products to have Filkentscher K-values between about 40 and 60, such limitation is not absolute or of essential criticality for the realization of satisfactory results. Polyvinyllactams having either lower or higher K-values may also be suitably employed as substrates for the graft copolymeric additaments.

Besides those specifically illustrated, other organic sulfonic acids may also be utilized for the preparation of the graft copolymeric additaments of the present invention, such by way of illustration, as those which are set forth in the disclosure of United States Letters Patent No. 2,527,300. In addition to the sulfonic acid monomers specifically described in the foregoing examples, others that may advantageously be employed in the practice of the present invention include such organic sulfonic acids as 2-propene sulfonic acid; sodium para-vinylbenzene sulfonate; 2- and/or 3-sulfopropyl acrylate; 2-sulfoacrylate, sodium salt; sodium 3-allyloxy-2-hydroxypro-ortho-chloro-styrene sulfonate; 2-hydroxy-3-sulfopropyl acrylate, sodium salt; sodium 3-allyloxy-2-hydroxypropane sulfonate; 4-sulfophenyl acrylate, sodium salt; N-allyl imino di-(2-ethane sulfonic acid); and the like. Still others are set forth in the subsequent appendix annexed hereto.

The graft polymeric additaments that are employed in the practice of the invention may either be water-soluble or water-insoluble products. In either event, they are generally found to be readily dispersible in aqueous media by either dissolution therein or uniform dispersion throughout the medium to provide a usable product for impregnating purposes. The graft copolymers may generally be prepared by conventional methods of polymerization, including those which have been demonstrated in the foregoing illustrative examples. In addition to the usual catalysts, including persulfates, organic and inorganic peroxides and azo type catalysts, the graft-copolymers may oftentimes be polymerized under the influence of high energy radiation such as by means of X-rays and the like, or simply by heating and evaporating the monomer-containing polymerization mixture. The graft-copolymers may be prepared in both aqueous and organic solvent vehicles, using temperatures for the desired polymerization that may vary from about room temperature to the boiling point of the polymerization mixture. It is ordinarily satisfactory to conduct the reaction at a temperature of about 50 to 80 or 100° C. Usually, depending upon the specific factors that may be involved, the copolymerization may be accomplished satisfactorily within a time period of about 10 to 60 hours.

The compositions of the graft copolymerized polymeric additaments can vary within rather wide limits. Advantageously, the content of the poly-N-vinyllactam upon which the monomeric constituents are graft copolymerized is between about 10 and 90 percent, more advantageously between about 20 and 80 percent, of the weight of the graft copolymerized product with the content of either monomeric constituent being between about 10 and 90, more advantageously from about 30 to 70, mole percent of the polymerized monomer substituents in the graft copolymerized product. It may frequently be desirable for the monomeric constituents that are polymerized to be employed in nearly equivalent or about commensurate or equal molar proportions in the preparation of the graft copolymeric polymeric additament and for the quantity of the vinyl lactam polymer substrate to be at least half of the constitution of the graft copolymer product.

The polymerization system that is employed for the preparation of the copolymers employed in the present invention may consist of as much as 50 percent by weight of the monomers and poly-N-vinyllactam to be graft-copolymerized in the aqueous medium. The amount of monomeric and polymeric material that is provided in the polymerization system may be influenced somewhat by the manner in which it is intended to incorporate the product in the synthetic polymer compositions in order to provide the compositions of the invention.

If, for example, it is intended to incorporate the graft-copolymer products by blending into a fiber-forming composition prior to its fabrication into shaped articles, the copolymerization system may, if desired contain about equal proportions by weight of the charged materials and the polymerization medium which preferably is miscible with and tolerable in the spinning solution solvent being used. In case the graft-copolymer product is obtained as a gel, it may still be easily dispersed, after being dried and isolated from unreacted monomer, in order to be directly incorporated in the fiber-forming composition.

If the incorporation of the polymeric additament in a fiber-forming composition is to be achieved by impregnation therewith of an already-formed shaped article of the composition, it may be desirable to effect the polymerization so as to directly form the polymerization system as a suitable applicating emulsion or suspension or as a solution of the graft-copolymeric product depending on its particular solubility characteristics. For such purposes, the polymerization system may be prepared to contain as little as 2–10 percent by weight of the graft-copolymerizing ingredients. Preferably, such a polymerization may be conducted under the influence of vigorous agitation, especially to facilitate preparation of an emulsified or thoroughly dispersed product when a water-insoluble graft-copolymer is being made. It may also be beneficial under such circumstances to incorporate a dispersant or emulsifying agent in the polymerization system to facilitate obtaining a stable and homogenous emusified product. Such a method for preparing the graft-copolymeric additaments that are employed in the present invention may be especially appropriate when they are intended to be applied to acrylonitrile polymer fibers and the like that are derived from aquagels in the course of their manufacture, such as the acrylonitrile polymer fibers that are wet spun from aqueous saline solutions of the fiber-forming polymer.

In such instances, as has been demonstrated, the graft-copolymeric additaments may be impregnated from solution or suspension into the fiber while it is in a swollen or gel condition, as an acrylonitrile polymer fiber in an aquagel condition, in order to obtain the desired graft-copolymer-containing product.

In this connection, when it is desired to blend the polymeric additament in a synthetic polymer fiber-forming solution prior to its extrusion, such as an aqueous saline acrylonitrile polymer solution, the graft-copolymer may be physically reduced by comminution to a sufficiently fine state to permit its dispersion in spinnable condition throughout the blended spinning solution in the event that it is otherwise insoluble in the solvent. While this may be accomplished by diverse techniques, it is generally advantageous to comminute the polymeric additament in the presence of the non-dissolving solvent, such as an aqueous saline polyacrylonitrile solvent, to form a stable suspension that may be more conveniently blended with the spinning solution of the synthetic polymer, such as an aqueous saline acrylonitrile polymer spinning solution. Thus, if the aqueous, saline polyacrylonitrile solvent that is being employed is an aqueous solution of zinc chloride or its equivalent that contains at least about 55 percent and preferably about 60 percent by weight of dissolved zinc chloride, it may be advantageous to comminute the polymeric additament while it is in a mixture with the saline solvent solution that contains between about 5 and 10 percent by weight of the graft-copolymer. Analogous procedures may be employed when other solvents are involved. Ball or rod mills or other attrition apparatus may be employed beneficially for the comminution. It is generally beneficial under such circumstances to avoid the use of balls or rods that are made of metal since they may contaminate the product, especially when aqueous saline solvents are utilized. Porcelain or other ceramic parts may usually be employed with advantage. A stable suspension of an insoluble graft-copolymeric additament in the acrylonitrile polymer solvent that is suitable for blending in the spinning solution of the acrylonitrile polymer to provide a spinnable composition may usually be obtained by milling the mixture of polymeric additament and solvent for an extended period that may exceed 100 hours. The suspension that is thereby obtained may then be directly blended in the proper proportions with the acrylonitrile polymer spinning solution to provide a composition in accordance with the present invention. Of course, many of the graft copolymer products of the invention are directly soluble in such spinning solutions.

If desired, the graft-copolymer-containing acrylonitrile polymer compositions may comprise as much as 20 or more percent by weight of the graft-copolymeric additament based on the weight of the composition. Usually, however, suitable properties and characteristics and better fiber-forming properties in a given composition may be achieved when lesser proportions of the polymeric additament are incorporated therein. An appreciable improvement in dye-receptivity, antistatic properties and stability may frequently be obtained when a quantity of the graft-copolymeric additament that is less than 0.5 percent by weight is employed. Advantageously, an amount between about 2 and 15 percent by weight of the polymeric additament may thus be utilized in the composition. Greater advantages may often accrue when the amount of the polymeric additament that is incorporated in the composition is not in excess of about 10 percent by weight, based on the weight of the composition.

As has been indicated, the graft-copolymeric additaments may be incorporated in the acrylonitrile polymer compositions according to various techniques. Thus, for example, the additament and the acrylonitrile polymer may be directly blended in order to provide the composition which, incidentally, may be used for any desired fabrication purpose in addition to fiber-forming and the like. Beneficially, the polymers may be comminuted, either separately or in combination, before being intimately blended together by mechanical or other means. The blended polymers may be prepared into suitable fiber-forming systems by dispersing or dissolving them in a suitable liquid medium. Or, the compositions may be provided in fiber-forming system by sequentially dispersing or dissolving the polymers in any desired order in a suitable medium, as by incorporating the polymeric additament in a prepared acrylonitrile polymer spinning solution, dope or the like. As is obvious, the graft-copolymeric additaments employed in the practice of the present invention are frequently found to be insoluble. Despite this fact, they are, as has been indicated, readily dispersible in most solvents.

As is evident from the illustrative examples heretofore included, a highly advantageous technique for providing the compositions, particularly when acrylonitrile polymer fiber products are involved, is to apply or impregnate the polymeric additament from an aqueous solution or dispersion thereof to a shaped acrylonitrile polymer article that is in an aquagel condition in a manner similar and analogous to that employed for the impregnation of vinyl lactam polymers as described in the disclosure contained in the copending application of George W. Stanton, Theodore B. Lefferdink, Richard W. Meikle and Mary J. Charlesworth for a "Method and Composition For Rendering Polyacrylonitrile Readily Dyeable" having Serial No. 333,385 which was filed on January 26, 1953, now abandoned. Thus, an acrylonitrile polymer filamentary article that has been spun from an aqueous saline spinning solution may be conveniently passed, after its coagulation and while it is in an aquagel condition, through a water bath containing a dispersed graft-copolymeric additament in order to impregnate the filament with the graft-copolymer and provide a composition and an article in accordance with the invention. In addition, in situ polymerization techniques may be employed to provide the graft-copolymeric additament in the fiber product. Thus, the compositions may be made by impregnating an acrylonitrile polymer, such as a shaped article in aquagel form or other swollen condition, with the unpolymerized monomers and the vinyllactam polymer substrate and graft-copolymerizing them therein by means of radiation, dry heat or steam with or without other catalyzing influence.

The compositions of the invention may advantageously be utilized in or with fiber-forming systems of any desired type in order to provide fibers and the like according to procedures and techniques that are conventionally employed for such purposes in the preparation of fibers and such related shaped articles as filaments, strands, yarns, tows, threads, cords and other funicular structures, ribbons, tapes, films, foils, sheets and the like which may be manufactured from synthetic polymeric materials. It is frequently desirable to employ concentrated solutions of salts or mixtures of salts as the dispersing or dissolving media for such purposes. Such solutions may, as has been indicated, contain at least about 55 percent by weight, based on the weight of the solution, of zinc chloride or other known saline solvents for the polymer. Acrylonitrile polymer fiber products that are spun from saline fiber-forming systems may, by way of further illustration, be coagulated in more dilute saline solutions of a like or similar nature and may then be processed after coagulation according to conventional techniques of washing, stretching, drying, finishing and the like with the modification of the present invention being accomplished prior or subsequent to the spinning as may be desired and suitable in particular instances.

The acrylonitrile polymer fiber products in accordance with the present invention (one of which is schematically illustrated in the sole figure of the accompanying drawing) have excellent physical properties and other desirable characteristics for a textile material and have a high capacity for and are readily and satisfactorily dyeable to deep and level shades with any of a wide variety of dyestuffs. For example, they may be easily and successfully dyed according to conventional procedures using acid, vat, acetate, direct, napthol and sulfur dyes. Such dyestuffs, by way of didactic illustration, as Calcocid Alizarine Violet (Colour Index 61710, formerly Colour Index 1080), Sulfanthrene Red 3B (Colour Index Vat Violet 2), Amacel Scarlet GB (Colour Index 11110—also known as Amacel Scarlet BS, and having American Prototype Number 244), Calcodur Pink 2BL (Colour Index 353, also more recently, Colour Index Direct Red 75), Naphthol ASMX (Colour Index 35527), Fast Red Trn Salt (Colour Index Azoic Diazo Component 11), and Immedial Bordeaux G (Colour Index Sulfur Brown 12) may advantageously be employed for such purposes.

Other dyestuffs, by way of further illustration, that may be utilized beneficially on the graft copolymer-containing, polymer blended fiber products of the invention include such direct cotton dyes as Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Colour Index Direct Black 38), Niagara Blue NR (Colour Index Direct Blue 151) and Erie Fast Scarlet 4BA (Colour Index Direct Red 24); such acid dyes as Anthraquinone Green GN (Colour Index Acid Green 25), Sulfonine Brown 2R (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61, Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59), Calcocid Milling Red 3R (Colour Index Acid Red 151), Alizarine Levelling Blue 2R (Colour Index Acid Blue 51), Amacid Azo Yellow G Extra (Colour Index Acid Yellow 63); such mordant-acid dyes as Alizarine Light Green GS (Colour Index Acid Green 25); such basic dyes as Brilliant Green Crystals (Colour Index Basic Green 1) and Rhodamine B Extra S (Colour Index Vat Blue 35); such vat dyestuffs as Midland Vat Blue R Powder (Colour Index Vat Blue 35), Sulfanthrene Brown G Paste (Colour Index Vat Brown 5), Sulfanthrene Blue 2B Dbl. paste (Colour Index Vat Blue 5), and Sulfanthrene Red 3B paste (Colour Index Vat Violet 2); various soluble vat dyestuffs; such acetate dyes as Celliton Fast Brown 3RA Extra CF (Colour Index Dispersed Red 13), Artisil Direct Red 3BP and Celanthrene Red 3BN Conc. (Both Colour Index Dispersed Red 15), Celanthrene Pure Blue BRS 400 percent (Colour Index Dispersed Blue 1) and Acetamine Yellow N (Colour Index Dispersed Yellow 32); B-Naphthol←2-chloro-4-nitroaniline, an azoic dye; such sulfur dyes as Katigen Brilliant Blue GGS High Conc. (Colour Index Sulf. Blue 9) and Indo Carbon CLGS (Colour Index Sulf. Blue 6); and various premetallized dyestuffs.

The dyed products are generally lightfast and stable to heat and are well imbued with a resistance to crocking. In addition, the dyed products exhibit good washfastness and retain the dye-assisting polymeric additament in a substantially permanent manner despite repeated exposure and subjection to washing, laundering and dry cleaning treatments.

APPENDIX

Representative of the various monomeric organic sulfonic acid compounds, that may be employed satisfactorily in the practice of the present invention are those set forth in the following listing, wherein they are grouped according to the several designated types. The list, by no means exhaustive, includes species not mentioned in the foregoing.

Aromatic alkenyl group-containing sulfonic acid compounds (Formula II):
  Para-styrene sulfonic acid
  Ortho-styrene sulfonic acid
  Para-isopropenyl benzene sulfonic acid
  Para-vinyl benzyl sulfonic acid
  Otho-isopropenyl benzyl sulfonic acid
  Sodium para-styrene sulfonate
  Potassium ortho-styrene sulfonate
  Methyl para-styrene sulfonate
  Ethyl para-vinyl benzyl sulfonate
  Ortho vinyl benzene sulfonic acid
  Isopropyl ortho-isopropenyl benzene sulfonate
  n-Butyl ortho-styrene sulfonate
  Tertiary butyl para-styrene sulfonate
  2-chloro-4-vinyl benzene sulfonic acid
  4-bromo-2-isopropenyl benzene sulfonic acid
  3-vinyl toluene 6-sulfonic acid, sodium salt
  2-ethyl-4-vinyl-benzene sulfonic acid
  2,3-dichloro-4-vinyl benzene sulfonic acid
  2,3,5-tribromo-4-vinyl benzene sulfonic acid
  2-chloro-3-vinyl-toluene-6-sulfonic acid
  2,3-diethyl-4-vinyl-benzyl sulfonate, sodium salt
  Allyl taurine, potassium salt
  Methallyl taurine
  Methallyl taurine, methyl ester
  Methallyl taurine, isopropyl ester
  N-allyl-aminomethane sulfonic acid
  Sodium N-allyl-aminomethane sulfonate
  Lithium N-methallyl-aminomethane sulfonate
  n-Butyl N-allyl-aminomethane sulfonate
Alkenyl sulfonic acid compounds (Formula III):
  Ethylene sulfonic acid
  Sodium ethylene sulfonate
  Potassium ethylene sulfonate
  Methyl ethylene sulfonate
  Isopropyl ethylene sulfonate
  1-propene 3-sulfonic acid
  1-propene 1-sulfonic acid, sodium salt
  1-propene 2-sulfonic acid, ethyl ester
  1-butylene 4-sulfonic acid, n-butyl ester
  1-butylene 3-sulfonic acid
  Tertiary butylene sulfonic acid Sulfoalkylacrylate compounds (Formula IV):
  Sulfomethylacrylate
  2-sulfoethylacrylate
  Sulfomethylmethacrylate, sodium salt
  2-sulfoethylmethacrylate, methyl ester
  2-sulfoethylmethacrylate, potassium salt
Acryloyl taurine and homolog compounds (Formula V):
  N-acryloyl taurine
  N-acryloyl taurine, sodium salt
  N-methacryloyl taurine, methyl ester
  N-methacryloyl taurine, potassium salt
  N-acryloyl taurine, ethyl ester
  N-acryloyl-aminomethane sulfonic acid
  N-methacryloyl-aminomethane sulfonic acid, sodium salt
  Methyl N-methacryloyl-aminomethane sulfonate
Ally taurine and homolog compounds (Formula VI):
  Allyl taurine
  Allyl taurine, sodium salt

What is claimed is:
1. Composition comprising a major proportion of at least about 80 percent by weight, based on the weight of the composition, of (A) a fiber forming polymer of an ethylenically unsaturated monomeric material containing at least about 80 percent by weight of acrylonitrile and (B) a minor proportion of up to about 20 percent by weight, based on the weight of the composition, of a graft copolymer of (a) from about 10 to 90 percent by weight, based on the weight of the graft copolymer, of a mixture of monomers consisting of (1) from about 10 to 90 mole percent of an acrylate monomer of the formula:

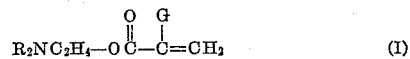
$$R_2NC_2H_4-O\overset{O}{\underset{}{C}}-\overset{G}{\underset{}{C}}=CH_2 \qquad (I)$$

wherein each R is independently selected from the group consisting of hydrogen, methyl and ethyl and G is selected from the group consisting of hydrogen and methyl; and (2) from about 90 to 10 mole percent of at least one alkenyl group-containing organic sulfonic acid compound selected from the group consisting of those represented by the formulae:

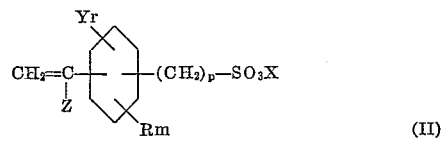
(II)

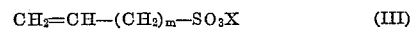
$$CH_2=CH-(CH_2)_m-SO_3X \qquad (III)$$

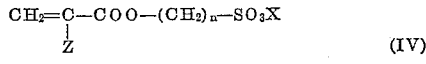
$$CH_2=C-COO-(CH_2)_n-SO_3X \\ \phantom{xxx}|\\ \phantom{xxx}Z \qquad (IV)$$

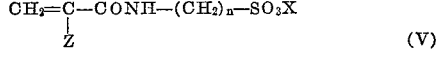
$$CH_2=C-CONH-(CH_2)_n-SO_3X \\ \phantom{xxx}|\\ \phantom{xxx}Z \qquad (V)$$

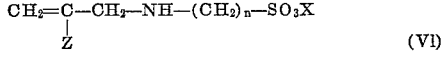
$$CH_2=C-CH_2-NH-(CH_2)_n-SO_3X \\ \phantom{xxx}|\\ \phantom{xxx}Z \qquad (VI)$$

wherein X is selected from the group consisting of hydrogen, saturated aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4; with (b) from about 90 to 10 percent by weight, based on the weight of the graft copolymer, of an N-vinyl lactam polymer.

2. The composition of claim 1 containing between about 0.5 to 15 percent by weight, based on the weight of the composition, of said graft copolymer.

3. The composition of claim 1 containing between about 2 and 10 percent by weight, based on the weight of the composition, of said graft copolymer.

4. The composition of claim 1, wherein the content of said poly-N-vinyl lactam with which said monomeric constituents are graft copolymerized is at least about 50 percent by weight, based on the weight of said graft copolymer.

5. A composition as set forth in claim 4, wherein said graft copolymer is comprised of between about 20 and 80 percent by weight of said poly-N-vinyl lactam with the balance of the weight of said graft copolymer being comprised of about equal molar proportions of each of components (1) and (2).

6. The composition of claim 1, wherein component (B) is a graft copolymer of styrene sulfonic acid and 2-aminoethylmethacrylate with poly-N-vinyl-2-pyrrolidone.

7. The composition of claim 1, wherein component (B) is a graft copolymer of 2-sulfoethylacrylate and 2-aminoethylmethacrylate with poly-N-vinyl-2-pyrrolidone.

8. The composition of claim 1, wherein component (B) is a graft copolymer of styrene sulfonic acid and dimethylaminoethylacrylate with poly-N-vinyl-2-pyrrolidone.

9. The composition of claim 1, wherein component (B) is a graft copolymer of acryloyl taurine and dimethylaminoethylacrylate with poly-N-vinyl-2-pyrrolidone.

10. The composition of claim 1, wherein component (B) is a graft copolymer of styrene sulfonic acid and diethylaminoethylmethacrylate with poly-N-vinyl-2-pyrrolidone.

11. The composition of claim 1, wherein the acrylonitrile polymer is polyacrylonitrile.

12. The composition of claim 1 dissolved in a solvent for polyacrylonitrile.

13. A filamentary shaped article comprised of a composition that is set forth in claim 1.

14. Method for the preparation of a dye-receptive, antistatic, stable to light and heat, synthetic, hydrophobic polymer composition which comprises immersing an aquagel of a fiber forming polymer of an ethylenically unsaturated monomeric material containing at least about 80 percent by weight of acrylonitrile in the form of a shaped article into a dispersion of a graft copolymer of from about 10 to 90 percent by weight, based on the weight of the graft copolymer, of (a) a mixture of monomers consisting of (1) from about 10 to 90 mole percent of an acrylate monomer of the formula:

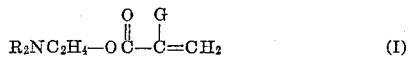   (I)

wherein each R is independently selected from the group consisting of hydrogen, methyl and ethyl and G is selected from the group consisting of hydrogen and methyl; and (2) from about 90 to 10 mole percent of at least one alkenyl group-containing organic sulfonic acid compound selected from the group consisting of those of the formulae:

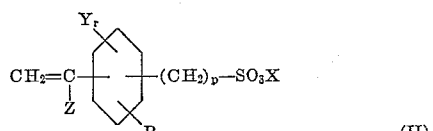   (II)

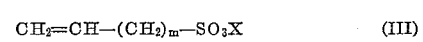   (III)

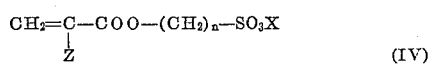   (IV)

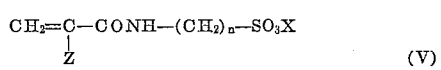   (V)

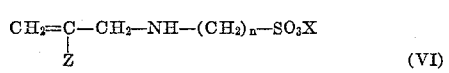   (VI)

wherein X is selected from the group consisting of hydrogen, saturated aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4; with ($b$) between about 90 and 10 percent by weight, based on the weight of the composition, of a poly-N-vinyllactam, until between about 0.5 and 20 percent by weight of said graft copolymer based on the resulting dry composition weight, is incorporated in said aquagel; and drying said graft copolymer-containing aquagel to convert it from the aquagel condition to a finished shaped article form.

15. The method of claim 14, wherein said acrylonitrile polymer is polyacrylonitrile.

16. The method of claim 14, wherein said poly-N-vinyl lactam is poly-N-vinyl-2-pyrrolidone.

17. The method of claim 14, wherein said shaped article is prepared in filamentary form.

18. A graft copolymer comprising between about 10 and 90 percent by weight of (a) a mixture of monomers consisting of (1) from about 10 to 90 mole percent of an acrylate monomer of the formula:

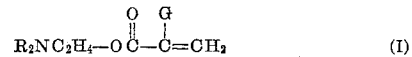   (I)

wherein each R is independently selected from the group consisting of hydrogen, methyl and ethyl and G is selected from the group consisting of hydrogen and methyl; and (2) from about 90 to 10 mole percent of at least one alkenyl group-containing organic sulfonic acid compound selected from the group of those represented by the formulae:

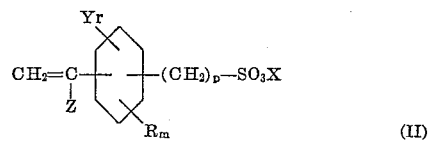   (II)

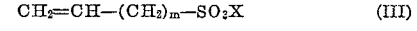   (III)

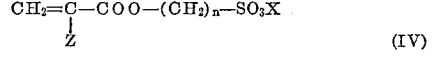   (IV)

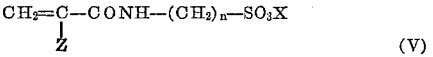   (V)

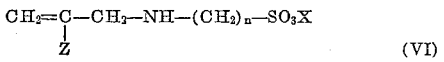   (VI)

wherein X is selected from the group consisting of hydrogen, saturated aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4; and ($b$) from about 90 to 10 percent by weight of an N-vinyl lactam polymer.

19. The graft copolymer of claim 18, containing from about 20 to 80 percent of about equal molar proportions of said mixture of monomers graft copolymerized with from about 80 to 20 percent of said poly-N-vinyl lactam.

20. Method for the preparation of a graft copolymer which comprises polymerizing with from about 90 to 10 percent by weight, based on the weight of the resulting graft copolymer, of an N-vinyl lactam polymer, between about 10 and 90 percent by weight of a mixture of monomers consisting of (1) from about 10 to 90 mole percent of an acrylate monomer of the formula:

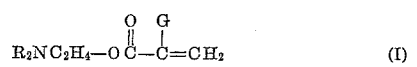   (I)

wherein each R is independently selected from the group consisting of hydrogen, methyl and ethyl and G is selected from the group consisting of hydrogen and methyl; and ($b$) from about 90 to 10 mole percent of at least one monomeric organic sulfonic acid compound selected from the group consisting of those represented by the formulae:

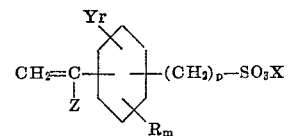
(II)

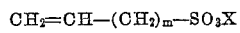
(III)

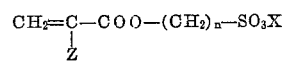
(IV)

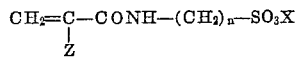
(V)

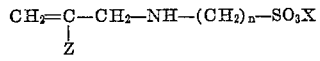
(VI)

wherein X is selected from the group consisting of hydrogen, saturated aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4.

21. The graft copolymer of claim 18 wherein said mixture of monomers consists of (1) from about 30 to 70 mole percent of said acrylate monomer of Formula I and (2) from about 70 to 30 mole percent of at least one of said organic sulfonic acid compounds selected from the group consisting of those represented by the Formulae II, III, IV, V and VI.

22. The graft copolymer of claim 18 wherein said vinyl lactam polymer is poly-N-vinyl-2-pyrrolidone.

References Cited in the file of this patent
UNITED STATES PATENTS

| | | |
|---|---|---|
| 2,138,763 | Graves | Nov. 29, 1938 |
| 2,417,312 | MacGregor | Mar. 11, 1947 |
| 2,418,696 | Cameron et al. | Apr. 8, 1947 |
| 2,614,289 | Cresswell et al. | Oct. 21, 1952 |
| 2,643,990 | Ham | June 30, 1953 |
| 2,688,008 | Chaney et al. | Aug. 31, 1954 |
| 2,735,831 | Coover | Feb. 21, 1956 |
| 2,776,270 | Coover et al. | Jan. 1, 1957 |
| 2,776,271 | Coover et al. | Jan. 1, 1957 |
| 2,790,783 | Coover | Apr. 30, 1957 |
| 2,821,519 | Glickman | Jan. 28, 1958 |
| 2,837,496 | Vandenberg | June 3, 1958 |
| 2,861,101 | Tousignant et al. | Nov. 18, 1958 |

FOREIGN PATENTS

| | | |
|---|---|---|
| 715,194 | Great Britain | Sept. 8, 1954 |

UNITED STATES PATENT OFFICE
CERTIFICATE OF CORRECTION

Patent No. 3,035,009                                       May 15, 1962

Stanley A. Murdock et al.

It is hereby certified that error appears in the above numbered patent requiring correction and that the said Letters Patent should read as corrected below.

Column 4, line 75, for "first" read -- fiber --; column 9, lines 11 and 12, strike out "acrylate, sodium salt; sodium 3-allyloxy-2-hydroxypro-ortho-chloro-styrene sulfonate;" and insert instead -- acrylic acid; sodium vinyl toluene sulfonate; potassium ortho-chloro-styrene sulfonate; --; column 13, lines 55 to 62, strike out the following:

Allyl taurine, potassium salt
    Methallyl taurine
    Methallyl taurine, methyl ester
    Methallyl taurine, isopropyl ester
    N-allyl-aminomethane sulfonic acid
    Sodium N-allyl-aminomethane sulfonate
    Lithium N-methallyl-aminomethane sulfonate
    n-Butyl N-allyl-aminomethane sulfonate and insert the same after "Allyl taurine, sodium salt" in line 19, column 14.

Signed and sealed this 18th day of December 1962.

(SEAL)
Attest:

ERNEST W. SWIDER                              DAVID L. LADD

Attesting Officer                                 Commissioner of Patents